United States Patent
Nandy et al.

(10) Patent No.: US 12,452,096 B2
(45) Date of Patent: Oct. 21, 2025

(54) EFFICIENT PROGRAMMING OF MULTICAST ROUTES IN FORWARDING HARDWARE

(71) Applicant: Hewlett Packard Enterprise Development LP, Spring, TX (US)

(72) Inventors: Tathagata Nandy, Bangalore (IN); Anil Raj, Bangalore (IN); Subramanian Muthukumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 506 days.

(21) Appl. No.: 18/117,868

(22) Filed: Mar. 6, 2023

(65) Prior Publication Data

US 2024/0305494 A1 Sep. 12, 2024

(51) Int. Cl.
*H04L 12/18* (2006.01)
*H04L 49/90* (2022.01)

(52) U.S. Cl.
CPC ............ *H04L 12/185* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 6,795,433 B1 * | 9/2004 | Li | H04L 12/18 370/392 |
| 7,447,225 B2 * | 11/2008 | Windisch | H04L 12/1877 370/428 |
| 2020/0120013 A1 * | 4/2020 | Goud Gadela | H04L 65/611 |

* cited by examiner

*Primary Examiner* — Anh Ngoc M Nguyen
(74) *Attorney, Agent, or Firm* — Yao Legal Services, Inc.

(57) ABSTRACT

A system for facilitating efficient multicast programming in a switch is provided. During operation, the system can parse a multicast data structure that can map an ingress interface, a source, and a multicast group to a set of egress interfaces. Based on the data structure, the system can generate a cache that can map an egress interface to an ingress interface indicated in the data structure. Upon receiving a join request via a first interface, the system can look up the first interface in the cache. If the first interface matches a cache entry, the system can identify an ingress interface from the cache entry. The system can then program, in the data structure, a route entry with the first interface as an egress interface and the ingress interface. Subsequently, if a multicast data packet matches the route entry, the system can forward the packet via the first interface.

20 Claims, 10 Drawing Sheets

EFFICIENT PROGRAMMING OF MULTICAST ROUTES IN FORWARDING HARDWARE

BACKGROUND

Field

The present disclosure relates to communication networks. More specifically, the present disclosure relates to a method and system for efficiently programming multicast forwarding entries in the forwarding hardware of a switch.

BRIEF DESCRIPTION OF THE FIGURES

In the figures, like reference numerals refer to the same figure elements.

DETAILED DESCRIPTION

In various Internet use cases, the switches often use multicast to distribute content such as video from a source to multiple hosts. Efficient distribution of multicast traffic can improve the performance of a network. A network-layer multicast protocol, such as protocol-independent multicast (PIM) can be used for distributing content in a heterogeneous network.

Typically, a host can send a client join request (e.g., an Internet Group Management Protocol (IGMP) join or a Multicast Listener Discovery (MLD) join request) to an upstream switch, which can be referred to as a client designated router (DR). The client DR can send a network join request (e.g., a PIM join) to a rendezvous point (RP) that a respective PIM-enabled switch can be aware of. A respective switch on the path to the RP can also send a PIM join to the RP. The source can then be registered with the RP and subsequently, from RP to the client DR. In this way, the client DR can receive data packets from the RP via the RP tree (RPT). The client DR can perform a route lookup toward the source. If the shortest path from the client DR to the source does not include the RP, the client DR can send a prune request via the RPT and send a network join request to the source. The source DR can then start receiving data packets from the source. Programming multicast routes in a switch is essential to the efficiency of a multicast protocol.

Examples described herein solve the problem of data-driven inefficient programming of multicast routes in the forwarding hardware of a switch by (i) generating a cache storing information on egress interfaces associated with a respective ingress interface based on currently programmed multicast routes; and (ii) upon receiving a join request via an interface, preprogramming a multicast route for the interface in the switch hardware based on the cached information. Typically, many multicast data flows (or multicast streams), such as video streams, are distributed from the same source in a network. The switch can have an existing multicast data flow for an ingress and egress interface pair. Upon receiving a join request at the egress interface, the switch can preprogram a multicast route in the forwarding hardware using information of the ingress interface without waiting for the data packet to arrive at the ingress interface.

With existing technologies, programming multicast routes in a switch is often data-driven. In other words, the establishment of new multicast routes is triggered by demand of the multicast content. Because a multicast tree is built based on hosts requesting the multicast data flow for a multicast group and a source providing the flow, how a multicast data packet should be forwarded may not be known to the switch. As a result, when the switch determines multicast routes for the multicast tree (e.g., by exchanging control packets), the multicast route information can be maintained in the software (e.g., the local multicast daemon, such as the PIM daemon). When a data packet arrives via a multicast route, the switch can determine that the multicast route is established in the network. Accordingly, the switch can program the multicast route in the forwarding hardware upon the arrival of the data packet.

For example, the switch can receive a client join request for a multicast group. Since the location of the source of the group is not known, the switch can send a network join request for the group to the RP. The RP can then forward the request to the source. The interface that receives the client join request can subsequently be the egress interface for the multicast data flow for the group. However, prior to receiving a packet of the flow, the SPT from the source to the switch may not be confirmed. Hence, the multicast route information can be maintained by the software.

Consequently, when a data packet from the source arrives at the switch via an ingress interface, the forwarding hardware of the switch does not have an entry for the ingress interface. Hence, instead of being processed at the forwarding hardware, the packet is promoted to the multicast daemon. The multicast daemon can then program the multicast route associated with the ingress and egress interfaces for the (source, group) pair in the forwarding hardware. The subsequent data packets for the group can then be forwarded by the forwarding hardware based on the programmed route. This process can be significantly slower than unicast route programming. As a result, some multicast services, such as Internet Protocol television (IPTV), can suffer from performance degradation.

To solve this problem, the switch can generate a multicast data structure, which can operate as a multicast cache, from the forwarding entries of the multicast routing data structure (MRDS) (e.g., a multicast forwarding information base (MFIB)) already programmed in the forwarding hardware of the switch. The MRDS can include an outgoing (or egress) interface list (OList) in association with a respective incoming (or ingress) interface for a corresponding multicast group. The switch can parse the multicast routes in the MRDS to generate the cache comprising reverse mappings of a respective ingress interface with a respective associated egress interface. In other words, for a respective egress interface, the cache includes a respective ingress interface that is already programmed in the forwarding hardware.

The cache can further maintain a count of the number of times an ingress interface has been programmed in the forwarding hardware for the egress interface. For example, if an egress interface receives traffic from an ingress interface for two multicast data flows, the cache entry for the egress interface and the ingress interface pair can be two. If the same egress interface receives one multicast data flow from another ingress interface, the cache entry for the egress interface and the other ingress interface pair can be one. Here, the count can be indicative of how likely an egress interface is to receive a data flow from an ingress interface.

When the switch receives a join request, which can be either a client or network join request, for a multicast group via an interface, the switch can consider the interface as the egress interface for subsequent data flow for the group. The switch can then look up the egress interface in the cache. If a matching entry is found, the switch can preprogram a multicast route in the forwarding hardware (e.g., in the MFIB) for the group based on the ingress interface of the matched entry. If the egress interface matches multiple entries, the switch can determine the entry with the highest count value among the matched entries and preprogram a multicast route with the ingress interface of the entry. This preprogrammed multicast route can be a "tentative route" that can be programmed without waiting for a data packet to arrive at the ingress interface via an SPT.

When the switch receives a data packet via the SPT, the forwarding hardware can perform a lookup in the MRDS. If the packet matches the preprogrammed route, the forwarding hardware can readily forward the packet via the egress interface. On the other hand, if the packet does not match the preprogrammed route, the legacy data-driven route programming can be used by promoting the packet to the multicast daemon. If no packet matches the preprogrammed route for a period, the preprogrammed route can be timed out and removed. Hence, cache-based preprogramming can coexist with the legacy system and operate without changing the existing system. Since there can be a limited number of sources for many multicast data flows, the likelihood of matching the preprogrammed route can be high. Hence, the cache can facilitate efficient preprogramming of multicast routes in the forwarding hardware and reduce latency caused by data-driven route programming.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z or Compute Express Link (CXL) network, a processor device, or a fabric switch comprising a plurality of similar or heterogeneous smaller physical and/or virtual switches.

A phrase indicating a device, such as "node," "machine," "entity," or "device" may indicate a switch and an end host, such as a user device. The term "message" refers to a group of bits that can be transported together across a network. "Message" should not be interpreted as limiting examples of the present examples to a particular layer of a network. "Message" can be replaced by other terminologies referring to a group of bits, such as "information," "data," "request," "response," "packet," "frame," "cell," "datagram," or "transaction." Furthermore, the term "port" can refer to the port that can receive, store, or transmit data. "Port" can also refer to the hardware, software, and/or firmware logic that can facilitate the operations of that port.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

Figure 1:
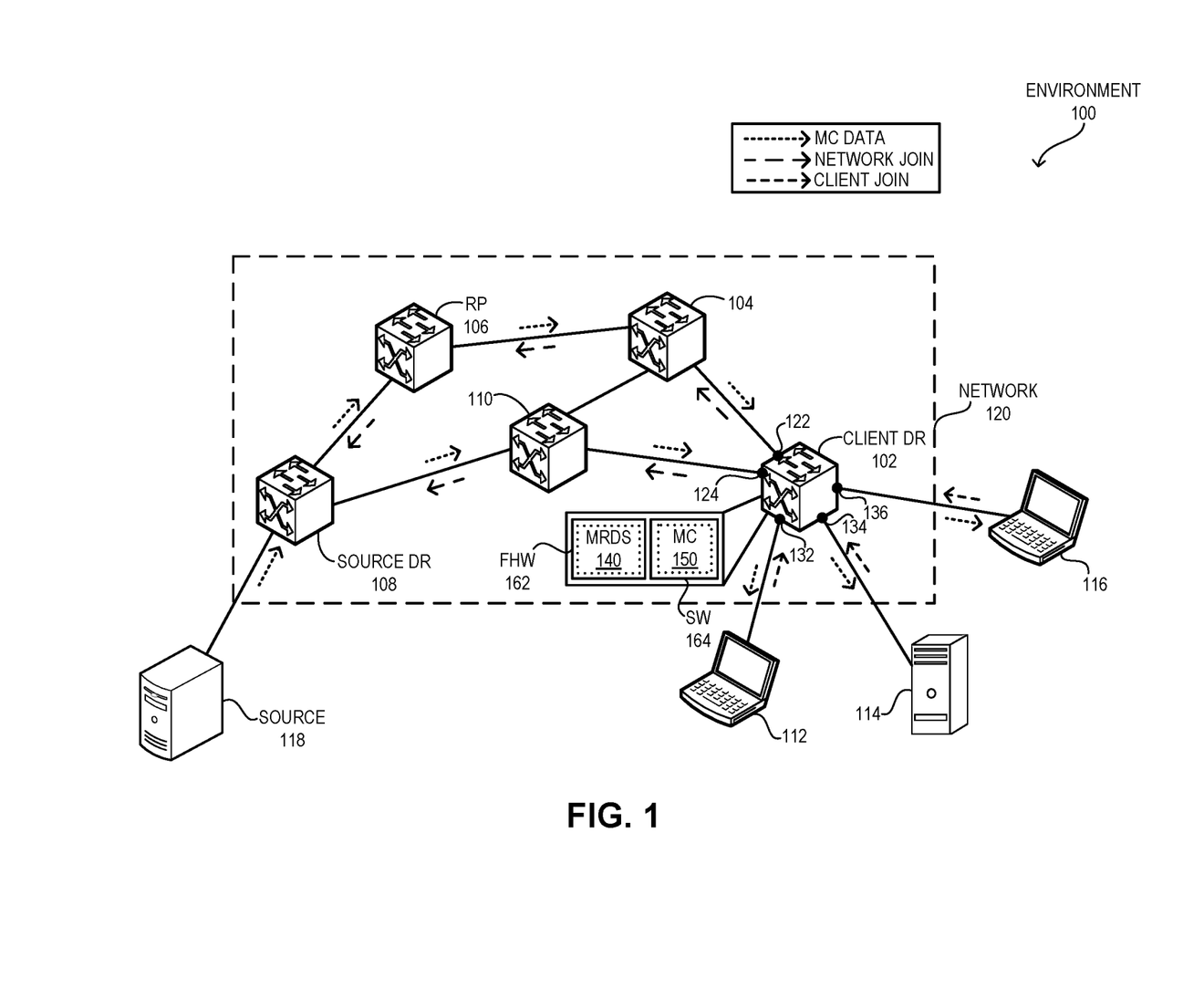
FIG. 1 illustrates an example of a network supporting efficient programming of multicast forwarding entries in the forwarding hardware of a switch, in accordance with an aspect of the present application.

FIG. 1 illustrates an example of a network supporting efficient programming of multicast forwarding entries in the forwarding hardware of a switch, in accordance with an aspect of the present application. A distributed environment 100 can include a network 120 that can include a plurality of switches 102, 104, 106, 108, and 110. In some examples, network 110 can be an Ethernet, InfiniBand, PCIe, Gen-Z, CXL, or other networks, and may use a corresponding communication protocol, such as Internet Protocol (IP), FibreChannel over Ethernet (FCOE), or other protocol. A number of end devices 112, 114, and 116 can be coupled to switch 108, and end device 118 can be coupled to switch 102. Service sources 112 and 114 can provide one or more services in environment 100 and be reachable via network 100 from service clients 116 and 118.

One or more links in network 120 can be tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec). A virtual private network (VPN), such as an Ethernet VPN (EVPN), can be deployed over network 120. Network 120 can include a virtual gateway switch (VGS) that can couple network 120 to external networks. Here, a plurality of switches of network 120 (not shown in FIG. 1) can operate as a single switch in conjunction with each other to facilitate the VGS. The VGS can be associated with one or more virtual addresses (e.g., a virtual IP address and/or a virtual MAC address).

An end device requesting a multicast data flow can be referred to as a host. On the other hand, an end device transmitting the data flow can be referred to as a source. In this example, end devices 112, 114, and 116 can be hosts, and end device 118 can be a source of one or more multicast groups. During operation, host 112 can send a client join request (e.g., an IGMP join) to switch 102, which can be referred to as a client DR, via interface 132 for a multicast group. Interface 132 can then be an egress interface toward host 112 for the group. Client DR 102 can send a network join request (e.g., a PIM join) to switch 106, which can be configured as an RP in network 120, via an intermediate switch 104. Source 118 can send the data packets of the multicast data flow via switch 108, which can be referred to as a source DR. It should be noted that source 118 may have already started the data flow before host 112 sending the join request.

Upon receiving data from source DR 108 (e.g., in PIM register packets), RP 106 can forward the data packet to client DR 102 through the RPT. Subsequently, client DR 102 can receive the data via interface 122. Client DR 102 can discover an Internet Protocol (IP) address of source 118 from the data packet and perform a route lookup toward source 118. Since the shortest path from client DR 102 to source 118 does not include RP 106, client DR 102 can send a prune request via the RPT and send a network join request to source 118. Source DR 102 can then start receiving data packets from source 108 through the SPT via interface 124, which can be the ingress interface for the data flow. In the same way, upon receiving respective join requests from hosts 114 and 116 via interfaces 134 and 136, respectively, source DR 102 can also start receiving data via interface 124 and forwarding the data via interfaces 134 and 136.

With existing technologies, programming multicast routes in client DR 102 is data-driven. Because the RPT and SPT are built based on hosts 112, 114, and 116 requesting the multicast data flow for the group and source 118 providing the flow, how a multicast data packet should be forwarded in network 120 may not be known to client DR 102. As a result, when client DR 102 determines multicast routes for the SPT (e.g., by exchanging control packets), the route information associated with the SPT is maintained in software 164 (e.g., the operating system), which can include the multicast daemon, of client DR 102. When a data packet arrives via the SPT at interface 124, client DR 102 can determine that the SPT is established in network 120. Accordingly, client DR 102 can program the multicast route associated with the SPT in forwarding hardware 162 upon the arrival of the data packet.

Consequently, when the data packet from source 118 arrives at client DR 102 via ingress interface 124, forwarding hardware 162 may not have an entry for ingress interface 124. Hence, instead of being processed at forwarding hardware 162, the packet is promoted to software 164. The multicast daemon in software 164 can then program the route associated with ingress interface 124 and egress interface 132 for source 118 and the multicast group pair in a multicast route data structure (MRDS) 140, such as an MFIB, in forwarding hardware 162. The subsequent data packets for the group can then be forwarded by forwarding hardware 162 based on the programmed route. This process can incur latency when a new route is programmed. As a result, users of hosts 112 and 114 can observe performance degradation for some multicast services, such as IPTV services.

To solve this problem, client DR 102 can generate a multicast cache 150 from the forwarding entries already programmed in MRDS 140 in forwarding hardware 162. A respective entry in MRDS 140 can include a respective incoming (or ingress) interface and a corresponding OList for a multicast group. Client DR 102 can parse the multicast routes in MRDS 140 to generate cache 150. A respective entry in cache 150 can include reverse mappings of an ingress interface with a respective associated egress interface. In other words, for a respective egress interface, cache 150 can include a respective ingress interface that is already programmed in MRDS 140. If egress interfaces 132, 134, and 136 receive a multicast data flow from ingress interface 124, cache 150 can include three entries, each mapping one of egress interfaces 132, 134, and 136 to ingress interface 124.

Cache 150 can further maintain a count of the number of times an ingress interface has been programmed in MRDS 140 for the egress interface. For example, if egress interface 132 receives traffic from ingress interface 124 for two multicast data flows, the entry in cache 150 for egress interface 132 and ingress interface 124 pair can be two. If egress interface 132 receives one multicast data flow from ingress interface 122, the entry in cache 150 for egress interface 132 and ingress interface 122 pair can be one. Here, the count can be indicative of how likely egress interface 132 is to receive a data flow from an ingress interface. Hence, a higher count value in an entry can indicate a higher likelihood of being selected for being selected.

When client DR 102 receives a join request for a multicast group from host 116 via interface 136, client DR 102 can consider interface 136 as the egress interface for subsequent data flow for the group. Client DR 102 can then look up egress interface 136 in cache 150. If a matching entry is found, client DR 102 can preprogram a multicast route in MRDS 140 in forwarding hardware 162 for the group based on the ingress interface (e.g., interface 124) of the matched entry. If egress interface 136 matches multiple entries, client DR 102 can determine the entry with the highest count value among the matched entries and preprogram a multicast route with the ingress interface of the entry. This preprogrammed multicast route can be a "tentative route" that can be programmed in MRDS 140 without waiting for a data packet to arrive at the ingress interface via an SPT.

When client DR 102 receives a data packet, forwarding hardware 162 can perform a lookup in MRDS 140. If the packet matches the preprogrammed route, forwarding hardware 162 can readily forward the packet via egress interface 136. On the other hand, if the packet does not match the preprogrammed route, the legacy data-driven route programming can be used by promoting the packet to software 164. If no packet matches the preprogrammed route for a period, the preprogrammed route can be timed out and removed. Hence, preprogramming using cache 150 can coexist with the legacy system and operate without changing the existing system. Since end device 118 can be the source for many multicast data flows in network 120, the likelihood of matching the preprogrammed route in MRDS 140 can be high. Hence, cache 150 can facilitate efficient preprogramming of multicast routes in MRDS 150 in forwarding hardware 162 and reduce latency caused by data-driven route programming.

Figure 2A:
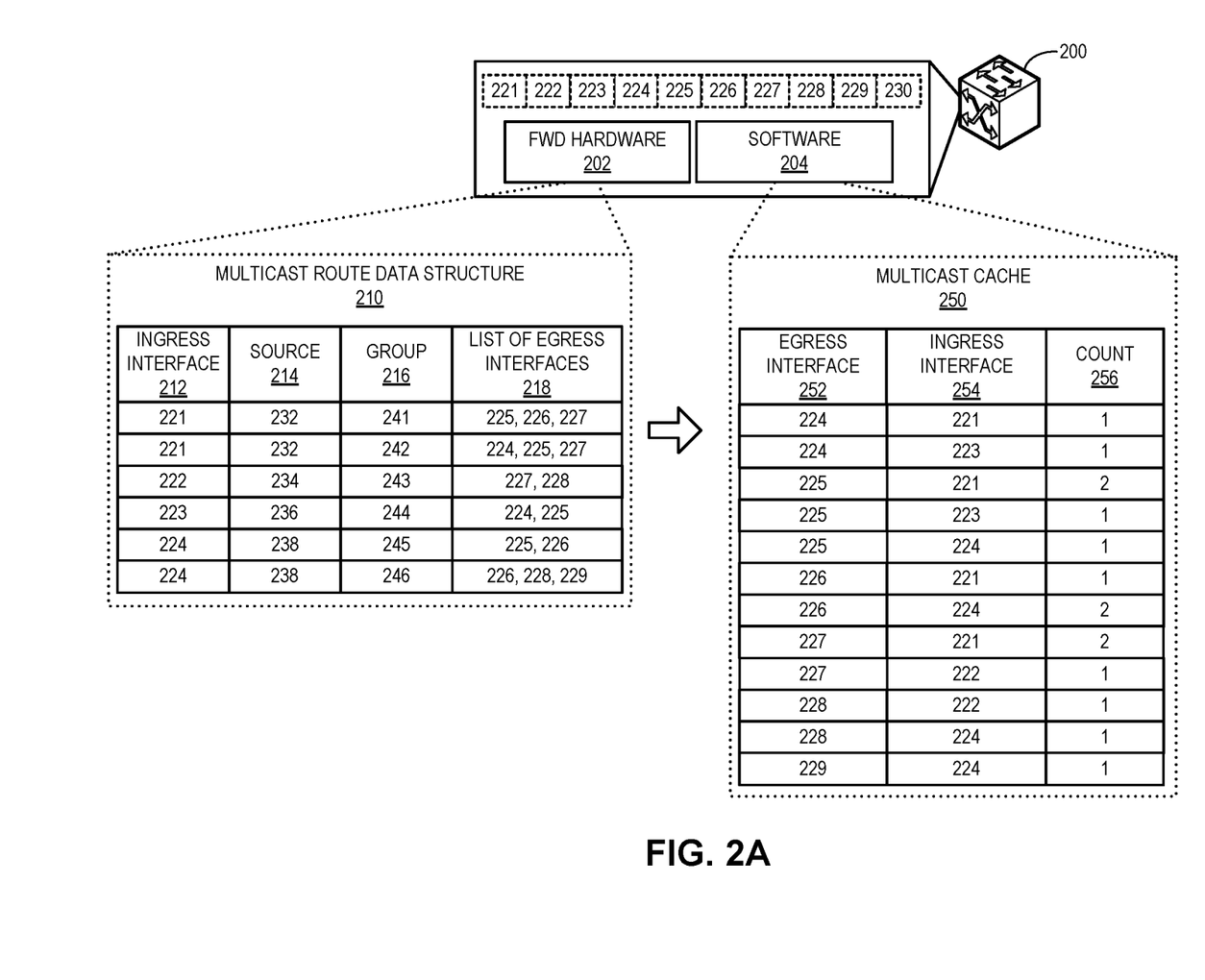
FIG. 2A illustrates an example of a data structure storing multicast cache for egress interfaces of a switch, in accordance with an aspect of the present application.

FIG. 2A illustrates an example of a data structure storing multicast cache for egress interfaces of a switch, in accordance with an aspect of the present application. A switch 200 can include a number of ports 221, 222, 223, 224, 225, 226, 227, 228, 229, and 230. Switch 200 can further include forwarding hardware 202 and software 204. Software 204 can be the operating system of switch 200 and include a multicast daemon. Forwarding hardware 202 can maintain an MRDS 210 (e.g., an MFIB). A respective entry of MRDS 210 can include a mapping of an ingress interface 212 to a list of egress interfaces 218 for a respective (source 214, group 216) pair. For example, an entry in MRDS 210 can include a mapping of ingress interface 212 to egress interfaces 225, 226, and 227 for a (source 232, group 241) pair. In the same way, MRDS 210 can include respective entries for (source 232, group 242), (source 234, group 243), (source 236, group 244), (source 238, group 245), and (source 238, group 246) pairs.

When the number of entries in MRDS 210 reaches a threshold, which can be preconfigured, switch 200 can parse MRDS 210 to generate a multicast cache 250. Before the number of entries of MRDS 210 reaches the threshold, switch 200 can populate MRDS 210 using the legacy data-driven multicast route programming. A respective entry of cache 250 can include a reverse mapping (i.e., the reverse of the mapping of MRDS 210) of an egress interface 252 to an ingress interface 254. When switch 200 receives a join request for a multicast group via an interface, the receiving interface can be considered as an egress interface for subsequent data packets of the multicast group. Hence, upon receiving a join request, the reverse mapping allows switch 200 to look up an entry in cache 250 based on egress interfaces.

MRDS 210 can include egress interface 225 in association with ingress interfaces 221, 223, and 224. Therefore, cache 250 can include respective mappings of egress interface 225 to ingress interfaces 221, 223, and 224. Similarly, cache 250 can include respective mappings of egress interface 224 to ingress interfaces 221 and 223 based on the corresponding entries in MRDS 210. Hence, interface 224 may appear as an egress interface in one entry while appearing as an ingress interface in another entry. Since interfaces 224, 225 226, 227, 228, and 229 appear as egress interfaces in MRDS 210, cache 250 can include one or more entries for each of these interfaces for corresponding ingress interfaces. On the other hand, interface 230 may not appear in cache 250 because interface 230 has not been programmed in a multicast route in MRDS 210.

Cache 250 can further maintain a count 256 of the number of times an ingress interface has been programmed in MRDS 210 for egress interface 252. Since egress interface 225 receives traffic from ingress interface 121 for two multicast data flows, the entry in cache 250 for egress interface 225 and ingress interface 221 pair can be two. On the other hand, since egress interface 225 receives one multicast data flow from ingress interfaces 223 and 224, the respective entries in cache 250 for the combination of egress interface 132 and ingress interfaces 223 and 224 can be one. Here, the count can be indicative of how likely egress interface 225 is to receive a data flow from an ingress interface. In this example, because of the count value of 2, the entry comprising ingress interface 221 can be selected for preprogramming for egress interface 225.

Figure 2B:
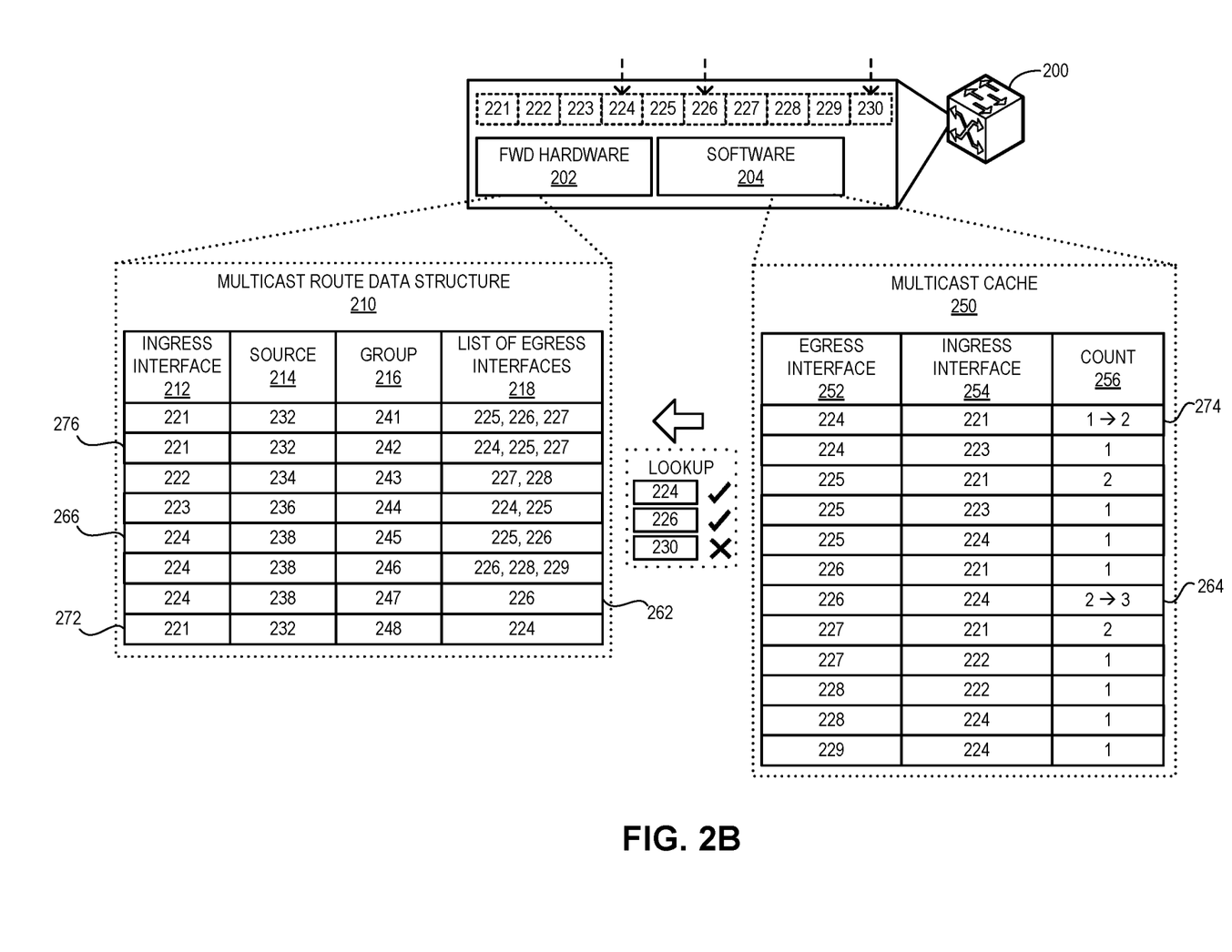
FIG. 2B illustrates an example of preprogramming a multicast forwarding entry in the forwarding hardware of a switch based on the corresponding multicast cache, in accordance with an aspect of the present application.

FIG. 2B illustrates an example of preprogramming a multicast forwarding entry in the forwarding hardware of a switch based on the corresponding multicast cache, in accordance with an aspect of the present application. Suppose that switch 200 receives respective join requests for a multicast group 247 via interfaces 226 and 230. Switch 200 can then look up interfaces 226 and 230 as egress interfaces in cache 250. Based on the lookup, switch 200 can find two matching entries for egress interface 226 in cache 250. These two entries can correspond to ingress interfaces 221 and 224 with count values of one and two, respectively. Because egress interface 226 matches multiple entries, switch 200 can determine that entry 264 with the highest count value (e.g., a value of two) among the matched entries corresponds to ingress interface 224.

Switch 200 can then preprogram a multicast route entry 262 in MRDS 210 based on entry 264 comprising ingress interface 224. The count value in entry 264 in cache 250 can then be incremented to three to represent entry 262 of MRDS 210. Since the combination of ingress interface 224 and egress interface 226 appears in entry 266 of MRDS 210, switch 200 can determine corresponding source 238 from entry 266. Switch 200 can then incorporate ingress interface 224, source 238, requested group 247, and egress interface 226 into entry 262. This preprogrammed multicast route 262 can be a "tentative route" that can be programmed in MRDS 210 without waiting for a data packet to arrive at ingress interface 224. When switch 200 receives a data packet of group 247, forwarding hardware 202 can perform a lookup in MRDS 210. If the packet matches entry 262, forwarding hardware 202 can readily forward the packet via egress interface 226.

However, if the data packet does not match entry 262, the timer for entry 262 can time out. Accordingly, forwarding hardware 202 can remove entry 262 from MRDS 210 and the count value in entry 264 can be decremented. The predictive preprogramming can then be considered unsuccessful for entry 262. On the other hand, since cache 250 does not have an entry for interface 230, the lookup operation for interface 230 in cache 250 can be unsuccessful. If the predictive preprogramming in MRDS 210 or the lookup operation on cache 250 is unsuccessful, the legacy data-driven route programming can be used. Hence, preprogramming using cache 250 can coexist with the legacy system and operate without changing the multicast daemon in software 204.

Switch 200 may also receive a join request for a multicast group 248 via interface 224 and look up interface 224 as egress interfaces in cache 250. Based on the lookup, switch 200 can find two matching entries for egress interface 224 in cache 250. These two entries can correspond to ingress interfaces 221 and 223, both having a count value of one. Because egress interface 224 matches multiple entries with the same count value, switch 200 can apply a tie-breaker method to the matched entries. The tie-breaker method can include one or more of: selecting the first matched entry, applying a hash function, and selecting based on load. The hash function can generate a hash key based on one or more of: the source IP address, an empty IP address, the group IP address, and the number of entries with the same count value (e.g., the number can two for egress interface 224). Suppose that, based on the tie-breaker method, switch 200 selects entry 274 corresponding to interface 221.

Switch 200 can then preprogram a multicast route entry 272 in MRDS 210 based on entry 274 comprising ingress interface 221. The count value in entry 274 in cache 250 can then be incremented to two to represent entry 272 of MRDS 210. Since the combination of ingress interface 221 and egress interface 224 appears in entry 276 of MRDS 210, switch 200 can determine corresponding source 232 from entry 276. Switch 200 can then incorporate ingress interface 221, source 232, requested group 248, and egress interface 224 into entry 272. When switch 200 receives a data packet of group 248, forwarding hardware 202 can perform a lookup in MRDS 210. If the packet matches entry 272, forwarding hardware 202 can readily forward the packet via egress interface 224.

Figure 3A:
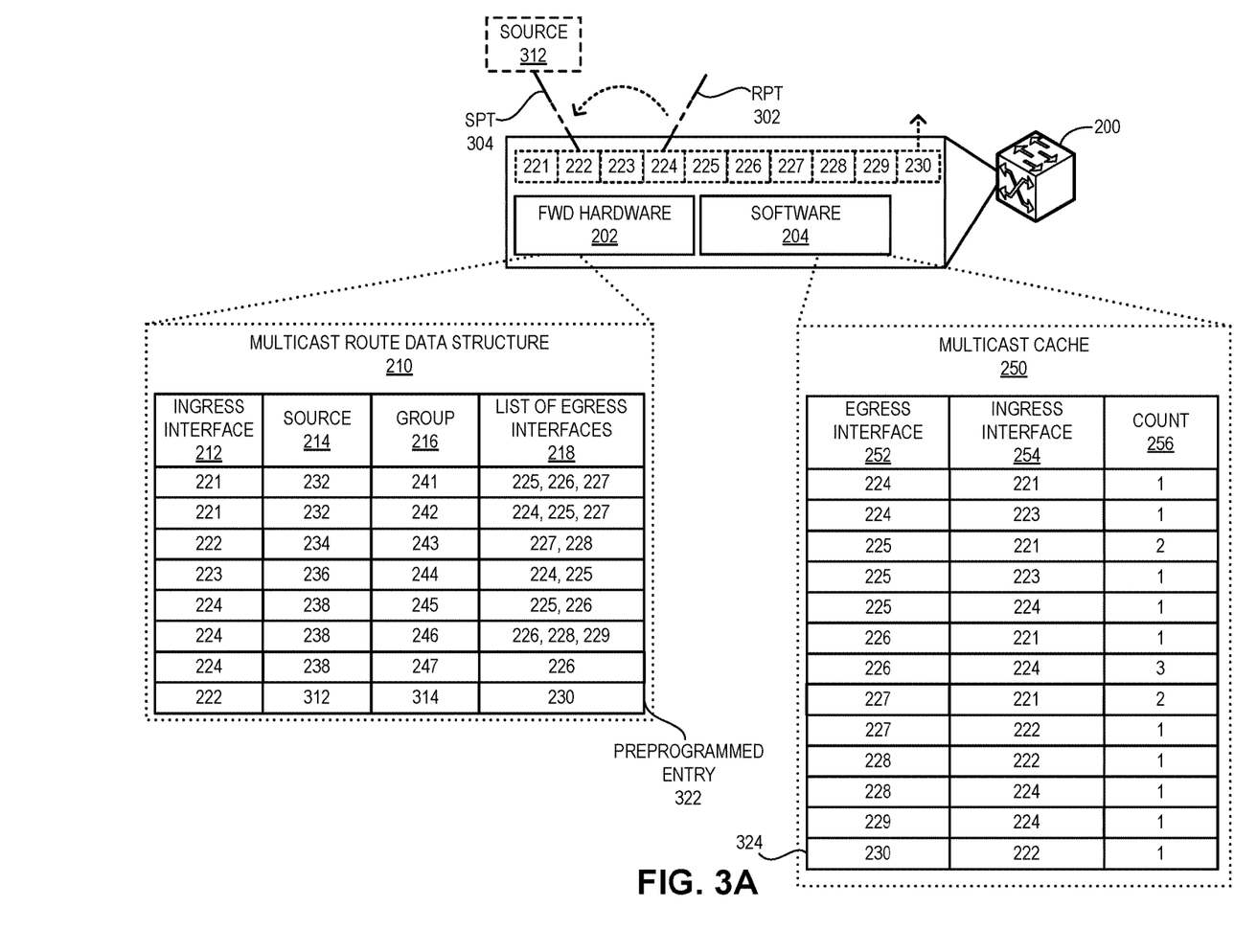
FIG. 3A illustrates an example of preprogramming a multicast forwarding entry in the forwarding hardware of a switch for the switchover to the shortest-path tree (SPT), in accordance with an aspect of the present application.

FIG. 3A illustrates an example of preprogramming a multicast forwarding entry in the forwarding hardware of a switch for the switchover to the SPT, in accordance with an aspect of the present application. Suppose that switch 200 receives data of multicast group 314 from an RPT 302 via ingress interface 224 and forwards the data to egress interface 230. Switch 200 can identify source 312 from the data and perform a shortest-path lookup for source 312. Based on the lookup operation, switch 200 can then determine that source 312 is reachable via interface 222. Accordingly, switch 200 can send a join request to source 312 via interface 222, thereby switching from RPT 302 to SPT 304 corresponding to source 312.

Instead of waiting for data to be received via interface 222 through SPT 304, switch 200 can preprogram an entry 322 in MRDS 210. Switch 200 can then incorporate ingress interface 222, source 312, requested group 314, and egress interface 230 into entry 322. Switch 200 can also insert an entry 324 for egress interface 230 and ingress interface 222 pair with a count value of one into cache 250. When switch 200 receives a data packet of group 314, forwarding hardware 202 can perform a lookup in MRDS 210. If the packet matches entry 322, forwarding hardware 202 can readily forward the packet via egress interface 230. However, if the data packet does not match entry 322, the timer for entry 322 can time out. Accordingly, forwarding hardware 202 can remove entry 322 from MRDS 210 and entry 324 from cache 250.

Figure 3B:
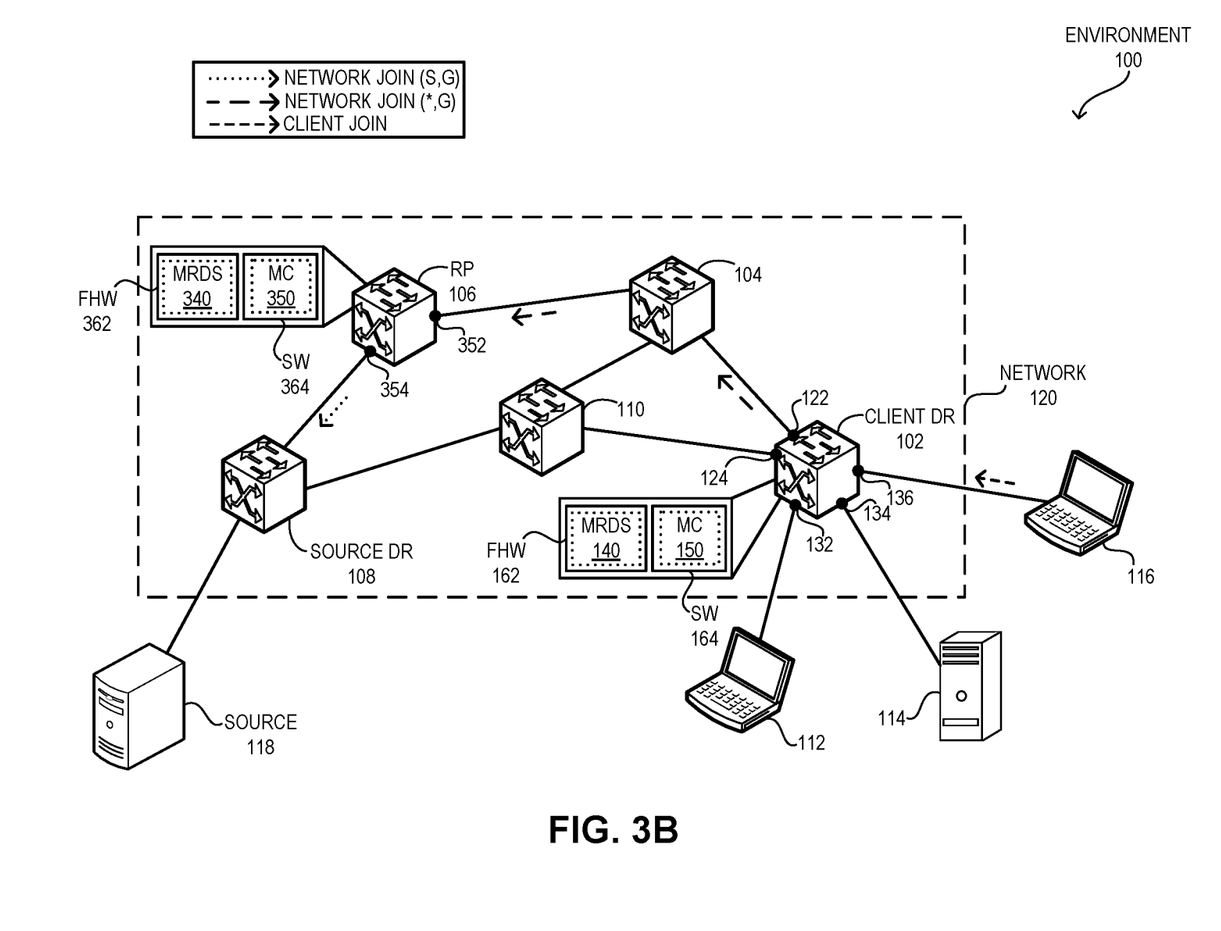
FIG. 3B illustrates an example of preprogramming a multicast forwarding entry to a source in the forwarding hardware of a rendezvous point (RP), in accordance with an aspect of the present application.

FIG. 3B illustrates an example of preprogramming a multicast forwarding entry to a source in the forwarding hardware of an RP, in accordance with an aspect of the present application. RP 106 of network 120 can maintain an MRDS 340 in forwarding hardware 362 and a multicast cache 350 in software 364. Suppose that client DR 102 sends a network join request toward RP 106. RP 106 can receive the join request via interface 352, which can be considered as the egress interface for subsequent data packets. RP 106 can then look up interface 352 in cache 350. If a matching entry is found, RP 106 can preprogram a multicast route in MRDS 340 in forwarding hardware 362 for the group based on an ingress interface 354 of the matched entry. RP 106 can then preprogram a multicast route in MRDS 340 with ingress interface 354 and egress interface 352.

Furthermore, even if source 118 has not started the multicast data flow, RP 106 can send a network join request via interface 354 instead of waiting for a register message from source 118. If source 118 is the source of the multicast group, source 118 can start receiving multicast data flow when source 118 starts the flow. Because of the join request sent to source 118, RP 106 can already be in the SPT. As a result, source 118 can send multicast data packets to RP 106 via the native path without encapsulating the packets in register packets.

Figure 4A:
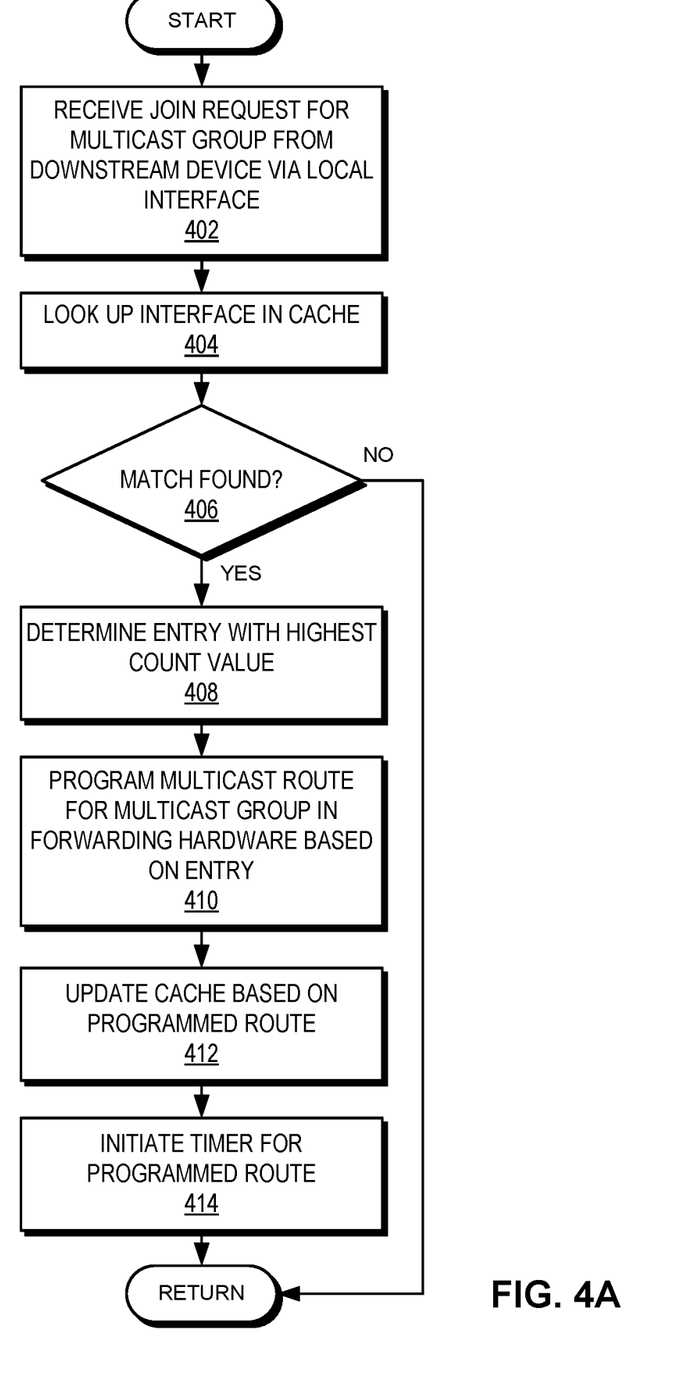
FIG. 4A presents a flowchart illustrating the process of a switch preprogramming a forwarding entry in the forwarding hardware based on the corresponding multicast cache, in accordance with an aspect of the present application.

FIG. 4A presents a flowchart illustrating the process of a switch preprogramming a forwarding entry in the forwarding hardware based on the corresponding multicast cache, in accordance with an aspect of the present application. During operation, the switch can receive a join request for a multicast group from a downstream device via a local interface (operation 402) and look up the interface in the cache (operation 404). The switch can then determine whether a match is found (operation 406). If a match is found, the switch can determine the entry with the highest count value (operation 408).

The switch can then program a multicast route for the multicast group in the forwarding hardware based on the entry (operation 410). Subsequently, the switch can update the cache based on the programmed route (operation 412). Updating the cache can include incrementing the count value of the entry in the cache. The switch may also initiate a timer for the programmed route (operation 414). The timer can be a feature of the forwarding hardware. Hence, a corresponding timer can be initiated for a respective entry in the MRDS of the switch.

Figure 4B:
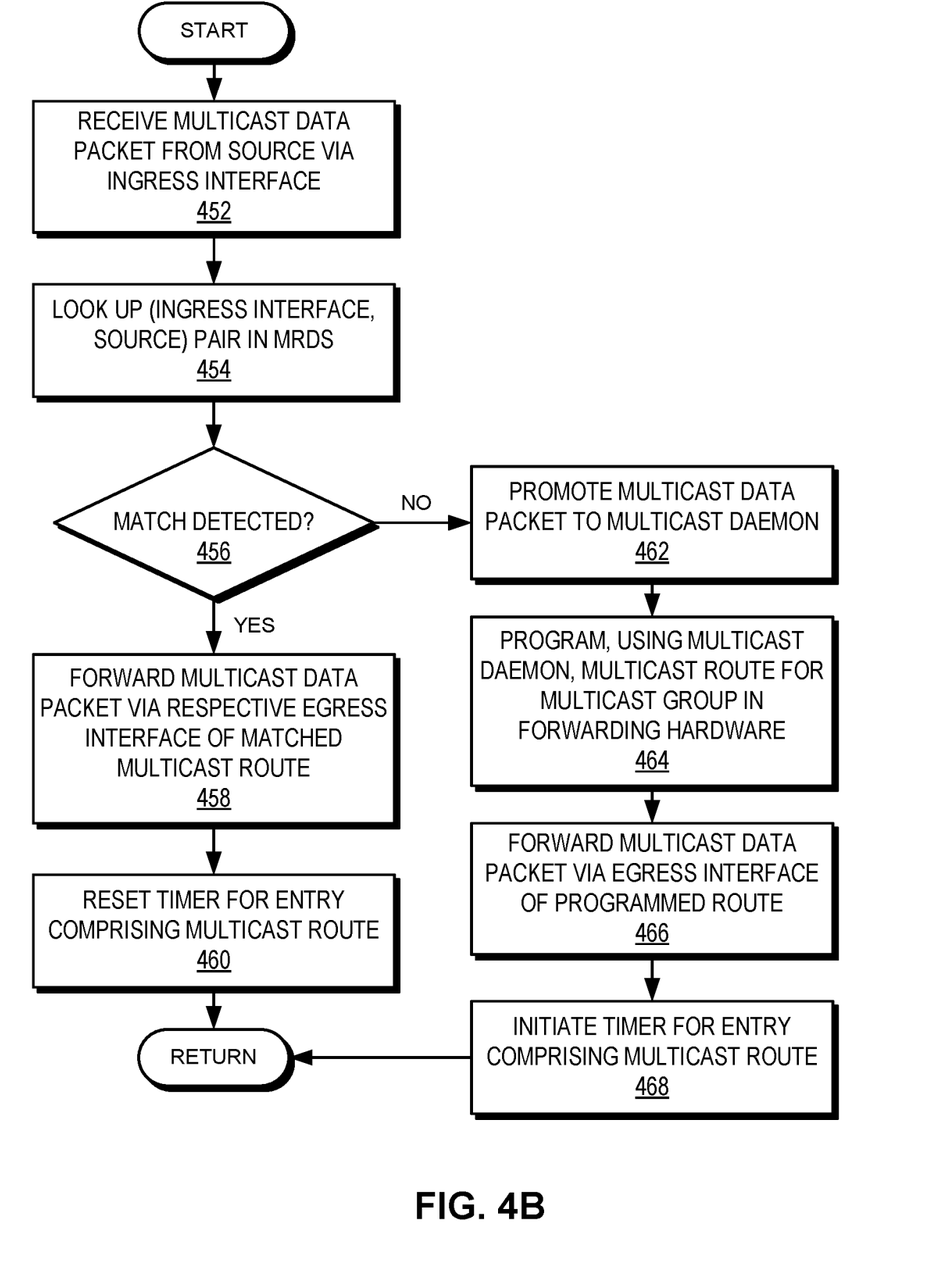
FIG. 4B presents a flowchart illustrating the process of a switch forwarding a multicast data packet, in accordance with an aspect of the present application.

FIG. 4B presents a flowchart illustrating the process of a switch forwarding a multicast data packet, in accordance with an aspect of the present application. During operation, the switch can receive a multicast data packet from a source via an ingress interface (operation 452) and look up the (ingress interface, source) pair in the MRDS (operation 454). The switch can then determine whether a match is detected (operation 456). If a match is detected, the switch can forward the multicast data packet via a respective egress interface of the matched multicast route (operation 458) and reset the timer for the entry comprising the multicast route (operation 460).

On the other hand, if a match is not detected, the switch can promote the multicast data packet to the multicast daemon (operation 462). The switch, using the multicast daemon, can then program a multicast route for the multicast group in the forwarding hardware (operation 464) and forward the multicast data packet via the egress interface of the programmed multicast route (operation 466). The switch can then start the timer for the entry comprising the multicast route (operation 468).

Figure 5A:
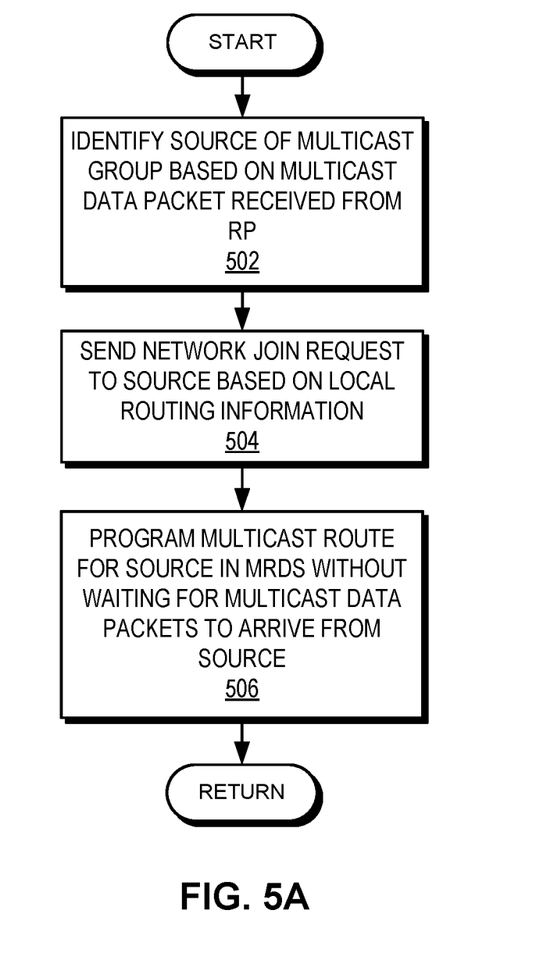
FIG. 5A presents a flowchart illustrating the process of a switch preprogramming a multicast forwarding entry in the forwarding hardware for the switchover to the SPT, in accordance with an aspect of the present application.

FIG. 5A presents a flowchart illustrating the process of a switch preprogramming a multicast forwarding entry in the forwarding hardware for the switchover to the SPT, in accordance with an aspect of the present application. During operation, the switch can identify the source of a multicast group based on a multicast data packet received from the RP (operation 502). The switch can then send a network join request to the source based on the local routing information (e.g., using the shortest-path route in the local forwarding table) (operation 504). The switch can then program a multicast route for the source in the MRDS without waiting for multicast data packets to arrive from the source (operation 506).

Figure 5B:
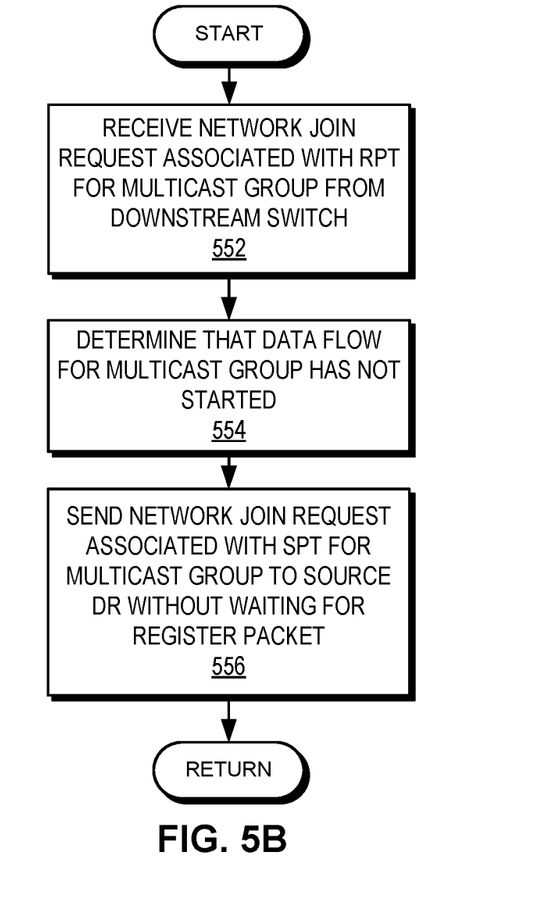
FIG. 5B presents a flowchart illustrating the process of an RP preprogramming a multicast forwarding entry to a source in the forwarding hardware, in accordance with an aspect of the present application.

FIG. 5B presents a flowchart illustrating the process of an RP preprogramming a multicast forwarding entry to a source in the forwarding hardware, in accordance with an aspect of the present application. During operation, the RP can receive a network join request associated with an RPT (i.e., a (*,G) join) for a multicast group from a downstream switch (operation 502). The RP can determine that the data flow for the multicast group has not started (operation 504). The RP can then send a network join request associated with an SPT (i.e., an (S,G) join) for the multicast group to the source DR without waiting for a register packet (operation 506).

Figure 6:
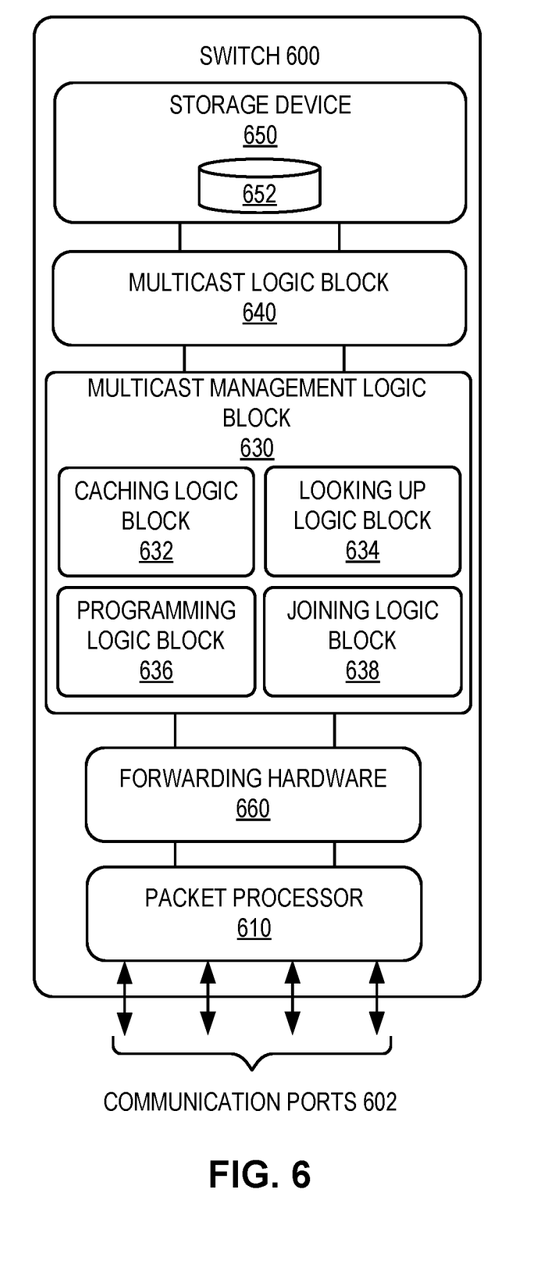
FIG. 6 illustrates an example of a switch supporting efficient programming of multicast forwarding entries in the forwarding hardware, in accordance with an embodiment of the present application.

FIG. 6 illustrates an example of a switch supporting efficient programming of multicast forwarding entries in the forwarding hardware, in accordance with an embodiment of the present application. In this example, a switch 600 includes a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 extracts and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can store information associated with routing and configuration associated with switch 600. For example, database 652 can maintain a copy of a multicast cache. Switch 600 can include a multicast management logic block 630 that facilitates efficient programming of multicast routes in forwarding hardware 660. Multicast management logic block 630 can include a caching entry local block 632, a looking up logic block 634, a programming logic block 636, and a joining logic block 638.

Caching local block 632 can generate the multicast cache based on the MRDS in forwarding hardware 660. Looking up logic block 634 can look up an egress interface in the cache upon receiving a join request and select an entry in the cache based on the corresponding count value or by applying a tie-breaking method. Programming logic block 636 can preprogram a multicast route in the MRDS based on the selected entry of the cache. Programming logic block 636 can also preprogram a multicast route associated with an SPT upon switching from the RPT. Joining logic block 638 can send a network join request to the source DR upon receiving a network join request from a downstream switch.

One aspect of the present technology can provide a system for facilitating efficient multicast programming in a switch. During operation, the system can parse a local multicast routing data structure. A respective entry of the multicast routing data structure can map a combination of an ingress interface, a source, and a multicast group to a set of egress interfaces. The system can generate a multicast cache based on the multicast routing data structure. A respective entry of the multicast cache can map an egress interface to an ingress interface indicated in the multicast routing data structure. Upon receiving a first join request for a first multicast group via a first interface, the system can look up the first interface in the multicast cache. If the first interface matches a cache entry in the multicast cache, the system can identify an ingress interface corresponding to the first interface from the cache entry of the multicast cache. The system can then program, in the multicast routing data structure for the first multicast group, a first route entry with the first interface as an egress interface and the identified ingress interface. Subsequently, if a multicast data packet matches the first route entry, the system can forward the multicast data packet via the first interface.

In a variation on this aspect, if the first interface does not match an entry in the multicast cache, the system can forward the first join request to a rendezvous point (RP) for the first multicast group and refraining from generating the cache entry.

In a variation on this aspect, the multicast routing data structure can be maintained in the forwarding hardware of the switch. On the other hand, the multicast cache can be maintained in a piece of software of the switch.

In a variation on this aspect, if the multicast data packet does not match the first route entry, the system can promote the multicast data packet to a multicast daemon of the switch.

In a further variation, the system can time out the first entry from the multicast routing data structure.

In a variation on this aspect, a respective entry in the multicast cache can include a count value of a number of times the identified ingress interface is included in the multicast routing data structure in association with the first interface.

In a further variation on this aspect, the first interface matching the cache entry can include identifying, in the multicast cache, a plurality of entries associated with the first interface and selecting the cache entry from the plurality of entries based on respective count values.

In a further variation, the system can update a count value of the cache entry.

In a variation on this aspect, upon identifying a source of a second multicast group, the system can program, in the multicast routing data structure for the second multicast group, a second route entry with a second interface associated with a shortest-path to the source prior to receiving a data packet from the source.

In a variation on this aspect, the system can send a join request to a source of a multicast group prior to receiving a data packet from the source.

The data structures and code described in this detailed description are typically stored on a computer-readable storage medium, which may be any device or medium that can store code and/or data for use by a computer system. The computer-readable storage medium includes, but is not limited to, flip/flops, latches, registers, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:
   parsing, by a switch, a local multicast routing data structure, wherein a respective entry of the multicast routing data structure maps a combination of an ingress interface, a source, and a multicast group to a set of egress interfaces;

generating a multicast cache based on the multicast routing data structure, wherein a respective entry of the multicast cache maps an egress interface to an ingress interface indicated in the multicast routing data structure;

in response to receiving a first join request for a first multicast group via a first interface, looking up the first interface in the multicast cache;

in response to the first interface matching a cache entry in the multicast cache, identifying an ingress interface corresponding to the first interface from the cache entry of the multicast cache;

programming, in the multicast routing data structure for the first multicast group, a first route entry with the first interface as an egress interface and the identified ingress interface; and in response to a multicast data packet matching the first route entry, forwarding the multicast data packet via the first interface.

2. The method of claim 1, wherein, in response to the first interface not matching an entry in the multicast cache, the method further comprises:

forwarding the first join request to a rendezvous point (RP) for the first multicast group; and refraining from generating the cache entry.

3. The method of claim 1, wherein the multicast routing data structure is maintained in forwarding hardware of the switch, and wherein the multicast cache is maintained in a piece of software of the switch.

4. The method of claim 1, wherein, in response to the multicast data packet not matching the first route entry, the method further comprises promoting the multicast data packet to a multicast daemon of the switch.

5. The method of claim 4, further comprising timing out the first entry from the multicast routing data structure.

6. The method of claim 1, wherein a respective entry in the multicast cache includes a count value of a number of times the identified ingress interface is included in the multicast routing data structure in association with the first interface.

7. The method of claim 6, wherein the first interface matching the cache entry in the multicast cache further comprises:

identifying, in the multicast cache, a plurality of entries associated with the first interface; and selecting the cache entry from the plurality of entries based on respective count values.

8. The method of claim 6, further comprising updating a count value of the cache entry.

9. The method of claim 1, wherein, in response to identifying a source of a second multicast group, the method further comprises programming, in the multicast routing data structure for the second multicast group, a second route entry with a second interface associated with a shortest-path to the source prior to receiving a data packet from the source.

10. The method of claim 1, further comprising sending a join request to a source of a multicast group prior to receiving a data packet from the source.

11. A non-transitory computer-readable storage medium storing instructions that when executed by a computing system cause the computing system to perform a method, the method comprising:

parsing, by the computing system, a local multicast routing data structure, wherein a respective entry of the multicast routing data structure maps a combination of an ingress interface, a source, and a multicast group to a set of egress interfaces;

generating a multicast cache based on the multicast routing data structure, wherein a respective entry of the multicast cache maps an egress interface to an ingress interface indicated in the multicast routing data structure;

in response to receiving a first join request for a first multicast group via a first interface, looking up the first interface in the multicast cache;

in response to the first interface matching a cache entry in the multicast cache, identifying an ingress interface corresponding to the first interface from the cache entry of the multicast cache;

programming, in the multicast routing data structure for the first multicast group, a first route entry with the first interface as an egress interface and the identified ingress interface; and in response to a multicast data packet matching the first route entry, forwarding the multicast data packet via the first interface.

12. The non-transitory computer-readable storage medium of claim 11, wherein, in response to the first interface not matching an entry in the multicast cache, the method further comprises:

forwarding the first join request to a rendezvous point (RP) for the first multicast group; and refraining from generating the cache entry.

13. The non-transitory computer-readable storage medium of claim 11, wherein the multicast routing data structure is maintained in forwarding hardware of the computing system, and wherein the multicast cache is maintained in a piece of software running on the computing system.

14. The non-transitory computer-readable storage medium of claim 11, wherein, in response to the multicast data packet not matching the first route entry, the method further comprises promoting the multicast data packet to a multicast daemon of the switch.

15. The non-transitory computer-readable storage medium of claim 14, wherein the method further comprises timing out the first entry from the multicast routing data structure.

16. The non-transitory computer-readable storage medium of claim 11, wherein a respective entry in the multicast cache includes a count value of a number of times the identified ingress interface is included in the multicast routing data structure in association with the first interface.

17. The non-transitory computer-readable storage medium of claim 16, wherein the first interface matching the cache entry in the multicast cache further comprises:

identifying, in the multicast cache, a plurality of entries associated with the first interface; and selecting the cache entry from the plurality of entries based on respective count values.

18. The non-transitory computer-readable storage medium of claim 16, wherein the method further comprises updating a count value of the cache entry.

19. The non-transitory computer-readable storage medium of claim 11, wherein, in response to identifying a source of a second multicast group, the method further comprises programming, in the multicast routing data structure for the second multicast group, a second route entry with a second interface associated with a shortest-path to the source prior to receiving a data packet from the source.

20. A computer system, comprising:
processing circuitry;
forwarding hardware;
a caching logic block to:
- parse a local multicast routing data structure, wherein a respective entry of the multicast routing data structure maps a combination of an ingress interface, a source, and a multicast group to a set of egress interfaces; and
- generate a multicast cache based on the multicast routing data structure, wherein a respective entry of the multicast cache maps an egress interface to an ingress interface indicated in the multicast routing data structure;

a programming logic block:
- in response to receiving a first join request for a first multicast group via a first interface, lookup the first interface in the multicast cache;
- in response to the first interface matching a cache entry in the multicast cache, identify an ingress interface corresponding to the first interface from the cache entry of the multicast cache; and
- program, in the multicast routing data structure for the first multicast group, a first route entry with the first interface as an egress interface and the identified ingress interface; and a forwarding logic block to, in response to a multicast data packet matching the first route entry, forward the multicast data packet via the first interface.

* * * * *